F. R. HELMER & A. F. WILKE.
MANURE LOADER.
APPLICATION FILED MAY 14, 1910.
985,260.
Patented Feb. 28, 1911.
3 SHEETS—SHEET 3.
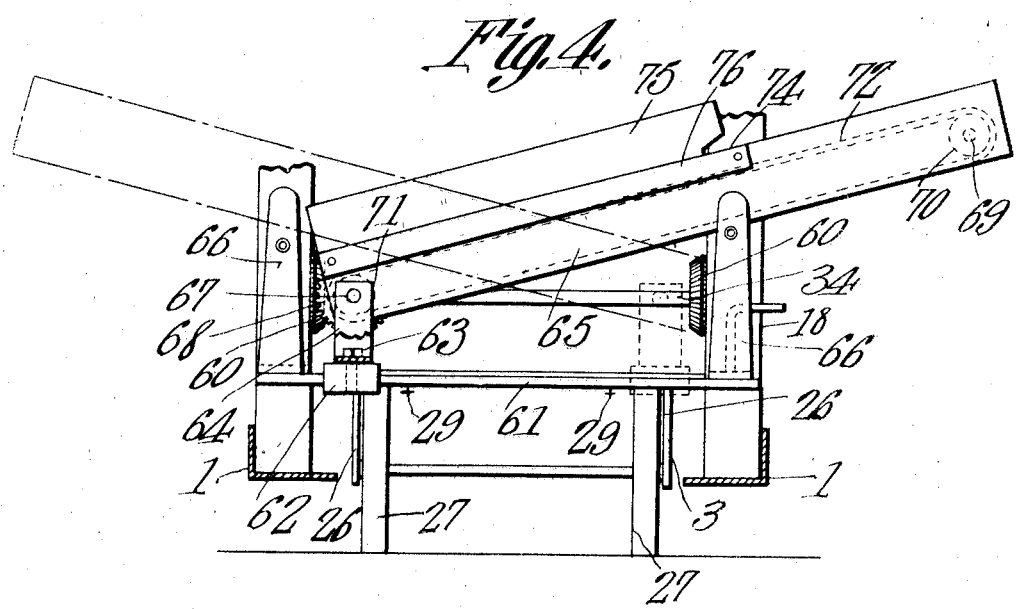
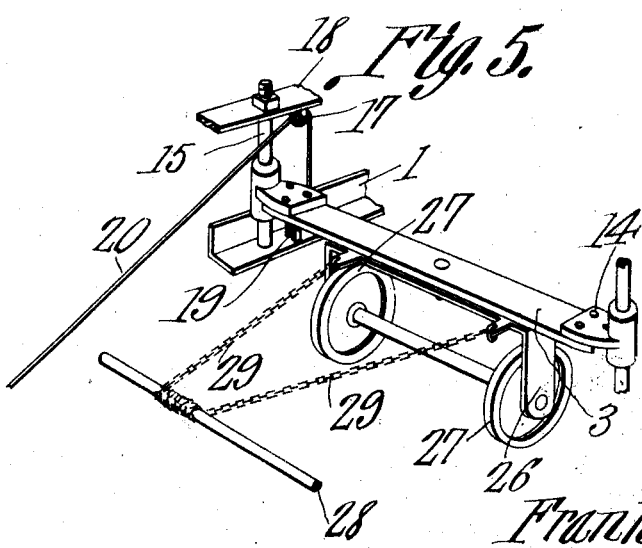
Witnesses
Frank R. Helmer and
August F. Wilke,
Inventor
by C. A. Snow & Co.
Attorneys

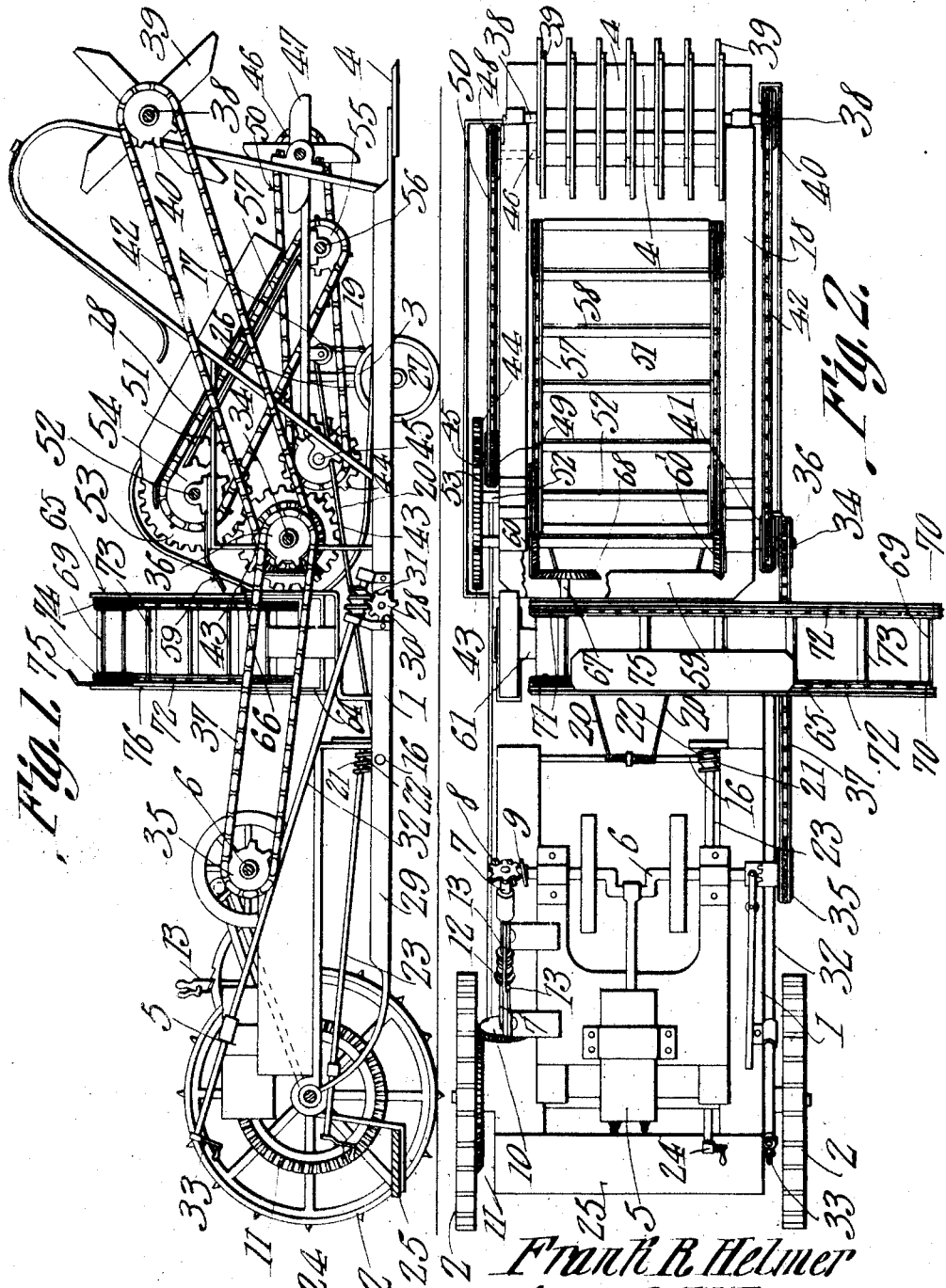

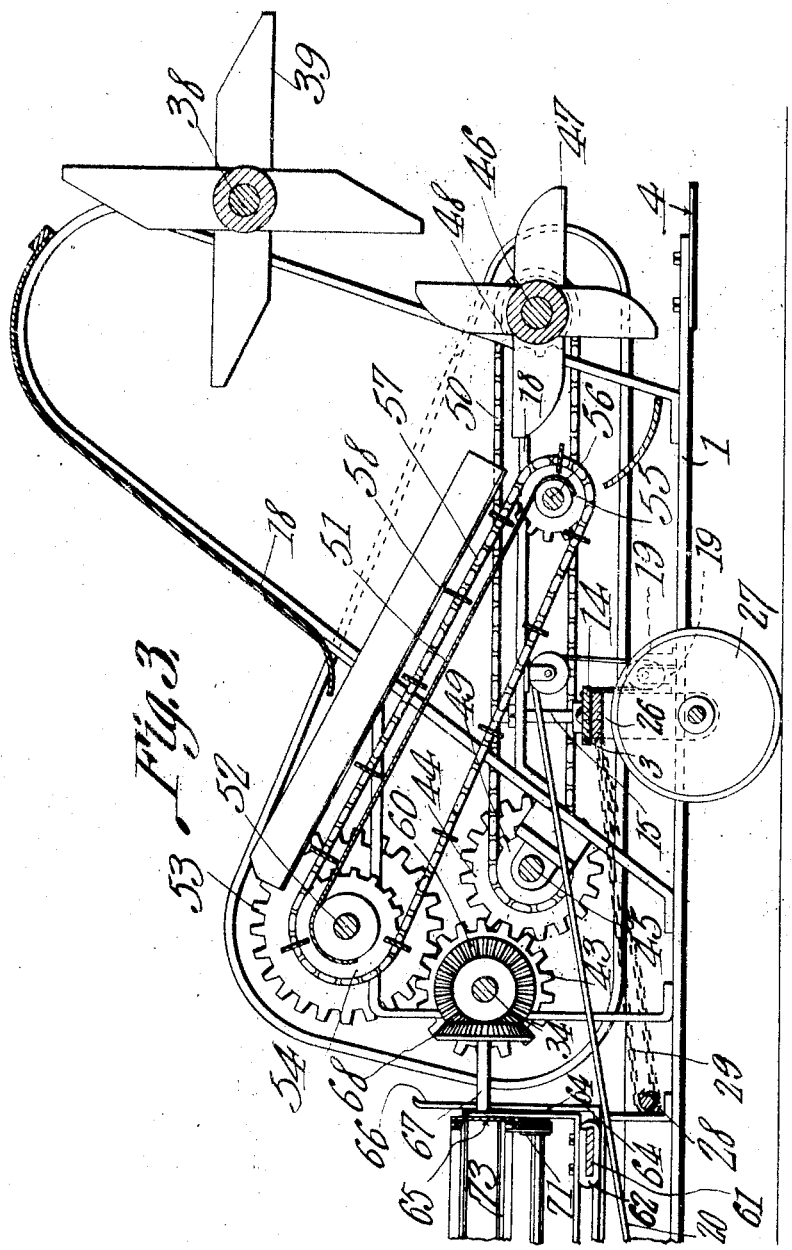

UNITED STATES PATENT OFFICE.

FRANK ROBED HELMER, OF JANESVILLE, WISCONSIN, AND AUGUST FREDERICK WILKE, OF SOUTH BELOIT, ILLINOIS.

MANURE-LOADER.

985,260.  Specification of Letters Patent.  Patented Feb. 28, 1911.

Application filed May 14, 1910. Serial No. 561,410.

*To all whom it may concern:*

Be it known that we, FRANK R. HELMER and AUGUST F. WILKE, subjects of the Emperor of Germany, residing, respectively, at Janesville and South Beloit, in the counties of Rock and Stephenson, States of Wisconsin and Illinois, have invented a new and useful Manure-Loader, of which the following is a specification.

This invention relates to a manure loader and consists in the novel construction and arrangement of its parts as hereinafter shown and described.

The object of the invention is to provide a self propelled machine adapted to be advanced toward a pile of material and having means for engaging the material and removing the same from the pile and elevating it to a laterally disposed conveyer from which it may be delivered into the body of a manure spreader or other receptacle. Also means is provided for steering the machine and for raising and lowering that end portion thereof at which the material engaging members are located. The transversely disposed conveyer is so mounted upon the machine that it may have its delivery end located at either side of the machine.

In the accompanying drawings:—Figure 1 is a side elevation of the manure loader. Fig. 2 is a top plan view of the same. Fig. 3 is a vertical sectional view of one end portion of the loader. Fig. 4 is a transverse sectional view of the loader showing the transversely disposed conveyer in side elevation. Fig. 5 is a perspective view of a portion of the loader.

The manure loader includes a frame 1 mounted at its rear end upon traction wheels 2 and at its forward end upon a dirigible truck 3. A share 4 is located at the forward end of the frame 1. An engine 5 is mounted upon the rear portion of the frame 1 and is operatively connected with a crank shaft 6 journaled upon the said frame. A shaft 7 is journaled for rotation at one side of the frame 1 and is provided at its forward end with a worm wheel 8 which engages a worm 9 mounted upon the end portion of the crank shaft 6. A pinion 10 is located upon the rear end of the shaft 7 and meshes with a crown gear 11 fixed to the side of one of the traction wheels 2. A clutch mechanism 12 is mounted upon the shaft 7 and is adapted to be manipulated by a lever 13 and may be moved so as to engage the hub of the pinion 10 to cause the said pinion to rotate in unison with the shaft 7 or to remain at rest while the said shaft is in rotation.

The truck 3 includes a frame 14 which is slidably mounted upon vertically disposed guides 15 mounted upon the forward portion of the frame 1. A shaft 16 is journaled for rotation upon the frame 1 and sheaves 17 are journaled upon a superstructure 18 mounted upon the forward portion of said frame 1. Sheaves 19 are journaled upon the forward portion of the frame 1 and cables 20 are arranged to wind at one end upon the shaft 16 and from thence they pass over the sheaves 17 thence down and under the sheaves 19 and are attached at their forward ends to the frame 14 of the truck 3. A worm wheel 21 is fixed to the shaft 16 and is engaged by a worm 22 fixed to a shaft 23. The shaft 23 is provided with a handle 24 located in the vicinity of the operator's platform 25. Thus it will be seen that by rotating the shaft 23 that the shaft 16 will be rotated and thus the cables 20 may be wound upon the shaft 16 or unwound therefrom. As the cables 20 are wound upon the shafts 16 the frame 14 will be pulled down along the guides 15 and thus the forward portion of the machine will be elevated. It of course follows that when the cables 20 are unwound from the shaft 16 the frame 14 will move upward along the guides 15 and the forward portion of the frame 1 will be lowered. The truck 3 also includes a yoke 26 which is pivoted at a point intermediate its ends to the frame 14 and to the end portions of which are journaled supporting wheels 27. A shaft 28 is journaled upon the frame 1 and cables 29 are arranged to wind at their inner ends upon the shaft 28 in opposite directions. The forward ends of the cables 29 are connected one to each end portion of the truck 26. A worm wheel 30 is fixed to the end of the shaft 28 is engaged by a worm 31 carried by a shaft 32 which is journaled upon the frame 1. The shaft 32 is provided at its rear end with a crank handle 33 located in the vicinity of the operator's platform 25. Thus it will be seen that means is provided for rotating the shaft 28 and as the shaft 28 is rotated in one direction one of the cables 29 will be wound upon the said shaft while the other cable 29 will be unwound therefrom. This variation in the lengths of the cables 29 will cause the yoke 26 to swing upon its pivot and thus means is provided for steering the forward supporting wheels 27 forming component parts of the truck 3.

As previously stated a superstructure 18 is mounted upon the forward end of the frame 1 and a master shaft 34 is journaled upon the said superstructure 18. A sprocket wheel 35 is fixed to the end of the crank shaft 6 of the engine 5 and a sprocket wheel 36 is fixed to the end of the master shaft 34. A sprocket chain 37 passes around the sprocket wheels 35 and 36 and is adapted to transmit rotary movement from the crank shaft 6 to the master shaft 34. A shaft 38 is journaled for rotation at the end of the superstructure 18 and in the vicinity of the upper end thereof and is provided at intervals along its length with radially disposed arms 39. A sprocket wheel 40 is fixed to the end portion of the shaft 38 and a sprocket wheel 41 is fixed to the master shaft 34. A sprocket chain 42 passes around the sprocket wheels 40 and 41 and is adapted to transmit rotary motion from the shaft 34 to the shaft 38.

A gear wheel 43 is fixed to the master shaft 34 and meshes with a gear wheel 44 fixed to an arbor 45 journaled for rotation upon the superstructure 18. A shaft 46 is journaled for rotation at the forward end of the superstructure 18 and below the shaft 38 above referred to and is provided at intervals along its length with radially disposed arms 47. A sprocket wheel 48 is fixed to the shaft 46 and a sprocket wheel 49 is fixed to the arbor 45. A sprocket chain 50 passes around the sprocket wheels 48 and 49 and is adapted to transmit rotary motion from the arbor 45 to the shaft 46. The shaft 46 rotates in an opposite direction from that in which the shaft 38 trotates. The shaft 38 rotates clockwise while the shaft 46 rotates counter-clockwise. An upwardly and rearwardly inclined elevator trunk 51 is mounted upon the superstructure 18 and a shaft 52 is journaled for rotation upon the upper portion of the superstructure 18 below the delivery end of the elevator trunk 51. A gear wheel 53 is fixed to the end of the shaft 52 and meshes with the gear wheel 43 hereinbefore described. Sprocket wheels 54 are fixed to the shaft 52 and sprocket wheels 55 are fixed to a shaft 56 which is journaled for rotation below the lower receiving end of the elevator trunk 51. Sprocket chains 57 pass around the sprocket wheels 54 and 55 and are connected together at intervals along their length by means of cross slats 58. The chains 57 and cross slats 58 constitute an endless conveyer, the upper run of which is located above the bottom of the trunk 51 and the lower run of which is located below the bottom of the said trunk. By this arrangement it will be seen that means is provided for transmitting rotary movement from the shaft 34 to the shaft 52 and through the chain 57 the endless conveyer referred to may be caused to move about the bottom of the trunk 51. A chute 59 is mounted upon the superstructure 18 and is located below the delivery end of the elevator trunk 51. Beveled gear wheels 60 and 60' are fixed to the master shaft 34 in the vicinity of the opposite ends thereof and are adapted to transmit motion from the said master shaft to the actuating shaft of a conveyer about to be described.

A cross bar 61 forms a portion of the superstructure 18 and a sleeve 62 is slidably mounted upon said cross bar. The said sleeve 62 may be secured in the vicinity of either end of the cross bar 61 by means of a bolt 63 or other securing device. Lugs 64 are mounted upon the upper portion of the sleeve 62 and the lower end of a conveyer trunk 65 is pivotally mounted between the upper ends of the lugs 64. Standards 66 are located at the sides of the superstructure 18 and are arranged in pairs each pair being adapted to receive the intermediate portion of the trunk 65 between them when the delivery end portion of the trunk is disposed over the upper end portion of the said standard. A shaft 67 is journaled for rotation at the receiving end of the trunk 65 and is provided with a beveled gear wheel 68 adapted to mesh with either the bevel gear wheel 60 or 60' mounted upon the master shaft 34.

A shaft 69 is journaled for rotation at the delivering end of the trunk 65 and sprocket wheels 70 are fixed to the said shaft 69. Sprocket wheels 71 are fixed to the shaft 67 and sprocket chains 72 are arranged to move about the sprocket wheels 70 and 71. The sprocket chains 72 are connected together by transversely disposed slats 73 and the said sprocket chains 72 and slats 73 constitute an endless conveyer mounted for movement longitudinally of the trunk 65. Thus it will be seen that when the shaft 67 is rotated from the master shaft 34 that the conveyer within the trunk 65 will move in an orbit longitudinally of the same. Plates 74 are spaced from the inner surfaces of the sides of the trunk 65 and the shank portion 76 of a hood 75 is adapted to be slipped between any one of the plates 74 and the adjacent side of the trunk 65. (See Fig. 1). By this arrangement of parts it will be seen that it is possible to have the parts arranged as indicated in heavy lines in Fig. 4 or as indicated in dotted lines. When the parts are arranged as indicated in heavy lines the beveled gear wheel 68 is in mesh with the beveled pinion 60 and the delivery end of the trunk 65 is disposed over the standard 66 on the opposite side of the machine. Therefore as the material is delivered upon the elevator above described which moves about the trunk 64 it is carried and delivered at one side of the machine. When however it is desired to deliver material at the opposite side of the machine the securing bolt 63 is removed and the sleeve 64 is shifted upon the cross bar 61 into the position indicated by dotted lines in Fig. 4. This will bring the gear wheel 68 into mesh with the beveled pinion 60'. The trunk 65 is removed from the shaft 67 and turned around and replaced upon the said shaft. The hood 75 is transferred from one side of the trunk 65 to the other side. Thus the parts are arranged so the material will be delivered at the opposite side of the machine from that at which it will be delivered when the parts are arranged as shown in heavy lines in Fig. 4.

In operation the lever 13 is swung so that the clutch mechanism 12 causes the pinion 10 to rotate with the shaft 7. Thus rotary movement is transmitted through one of the traction wheels 2 and the machine as an entirety may be advanced and directed toward a pile of material. At the same time rotary movement is transmitted as above described to the shafts 38 and 46 and when the arms 39 and 47 come in contact with the material the said material is pulled from the pile and carried up upon the elevator trunk 51 at the same time the share 4 cuts into the base of the pile of material. The material that is deposited upon the elevator trunk 51 is carried up by the chains 57 and slats 58 and is deposited upon the chute 59 from which it falls upon the conveyer in the trunk 65 and is transmitted to the delivery end of said trunk from which it may fall into the body of a manure spreader or other receptacle. By providing means for raising and lowering that end of the frame 1 at which the share 4 is located the said share may cut into the pile of material at the surface of the ground or below the same as desired.

Having described the invention what is claimed is:—

1. A manure loader comprising a wheel mounted frame, an engine located thereon, means for operatively connecting one of the wheels of the frame with the engine to propel the frame, means for raising or lowering the forward end of the frame, a share located at the forward end of the frame, upper and lower shafts journaled for rotation above said share and carrying radially disposed arms, an elevator located above said frame behind said shafts and a conveyer located above the frame below the delivery end of the elevator and means for operating the elevator and conveyer from the engine.

2. A manure loader comprising a wheel mounted frame, an engine located thereon, means for operatively connecting said engine with one of the supporting wheels of the frame, means for raising and lowering the forward end of the frame, means for steering the forward supporting wheels of the frame, a share located at the forward end of the frame, upper and lower shafts journaled for rotation above said share and carrying radially disposed arms, an elevator located above the frame behind said shafts, a conveyer located above the frame and below the delivery end of the elevator and means for operating the elevator and conveyer from the engine.

In testimony that we claim the foregoing as our own, we have hereto affixed our signatures in the presence of two witnesses.

FRANK ROBED HELMER.
AUGUST FREDERICK WILKE.

Witnesses:
  STANLEY J. DUNWIDDIE,
  ALFRED A. JACKSON.